United States Patent [19]

Wright

[11] 4,043,246
[45] Aug. 23, 1977

[54] SHEET METAL NAIL FOR SECURING COVERINGS TO CEMENTITIOUS MATERIALS

[75] Inventor: John L. Wright, Albuquerque, N. Mex.

[73] Assignee: W. R. Grace & Co., Cambridge, Mass.

[21] Appl. No.: 734,894

[22] Filed: Oct. 22, 1976

[51] Int. Cl.[2] .............................................. E01B 9/12
[52] U.S. Cl. ........................................... 85/11; 85/31
[58] Field of Search ................... 85/11, 13, 26, 28, 31, 85/85

[56] References Cited

U.S. PATENT DOCUMENTS

| | | | |
|---|---|---|---|
| 2,498,627 | 2/1950 | Hallock | 85/31 |
| 3,466,967 | 9/1969 | Hallock | 85/11 |
| 3,710,672 | 1/1973 | Hallock | 85/11 |
| 3,812,817 | 5/1974 | Hallock | 85/11 |
| 3,905,549 | 9/1975 | Walker | 85/26 |

Primary Examiner—Marion Parsons, Jr.
Attorney, Agent, or Firm—William L. Baker; C. E. Parker

[57] ABSTRACT

An improved fastener of the sheet metal type for anchoring coverings to soft, not-fully cured cementitious masses, has a head or cap portion and a hollow shank portion comprised of a pair of generally U-shaped, opposed legs, one leg being substantially fully enclosed within the other, one such leg being rigidly fixed to said head, the other leg being hingedly connected to the head whereby the rigid leg ensures proper alignment of the head with the surface of the covering material and the hinged leg is caused to spread upon installation and thereby lock the fastener within the cementitious mass.

6 Claims, 6 Drawing Figures

4,043,246

SHEET METAL NAIL FOR SECURING COVERINGS TO CEMENTITIOUS MATERIALS

BACKGROUND OF THE INVENTION

This invention relates to fasteners for securing covering materials to cementitious substrates. More particularly, this invention relates to an improved fastener of the sheet metal type, designed particularly for securing sheet coverings such as "base plys" to cementitious substrates such as lightweight insulating concretes while the cementitious substrate is in a soft, notfully cured condition.

In U.S. Pat. No. 3,710,672 to Robert L. Hallock, a sheet metal nail is described which is particularly useful for securing protective sheet coverings such as "base plys" to lightweight insulating concretes. These concretes are mixtures principally of lightweight aggregate such as expanded vermiculite, Portland cement and water. Base ply coverings are applied to the cast concretes before such have fully hardened, and the sheet metal nail described in the aforementioned Hallock patent is particularly effective in attaching the covering at this stage, that is while the concrete is still soft or "plastic". The fastener easily penetrates the covering and the soft concrete mass, spreading as it penetrates to insure a positive gripping in the subsequently hardened mass. Because of its special design, no void is left in the penetrated surof the concrete mass by the fastener, thereby eliminating an initial "yield", as well as offering greater resistance to the withdrawal of the fastener.

As described in U.S. Pat. No. 3,710,672, the Hallock sheet metal fastener has a head which also serves as a washer for holding the sheet covering, and a pair of opposed, generally U-shaped legs connected at one end to the head and terminating in penetrating ends. Each of the legs has a pair of longitudinally straight, parallel sides and a curved intermediate wall portion connecting the parallel sides. The legs further are designed such that the straight sides of one are received substantially their full width within the straight sides of the other. The opposed intermediate curved portions of the legs are separated at their head end and at their penetrating end substantially the same distance apart, the curved intermediate portion of each leg being curved inwardly. The legs are hinged to the head portion, this being the only means of connection with the head portion and to one another. Thus the legs move freely upon insertion in the concrete mass, the direction of movement being outwardly, that is, away from one another due to the curvature of the intermediate portions of the legs. Other features and advantages of the Hallock fastener are spelled out more fully in the U.S. Pat. No. 3,710,672, the disclosure of which is hereby incorporated by reference.

The fastener described in the aforementioned Hallock patent has met with significant commercial acceptance. However, one difficulty encountered in handling and use of the fastener resides in the tendency of the legs to lose proper positioning relative to the head. Since the legs are attached to the head only by the hinged connections thereto and not connected to one another, nor in any other fashion restricted from spreading, the fastener head can easily become "tilted," that is be positioned at an angle other than 90° to the direction of the center line of the legs. The results is that the head must be straightened in order to position and drive it properly using a manual hammer. Another undesired result occurs when automatic nailing machinery is used to insert the fastener. The disfigured fasteners cause jam-ups of the machinery, and sometimes cause the fastener to be crushed rather than driven because the legs do not enter the substrate "straight."

SUMMARY OF THE INVENTION

According to the present invention, one of the legs of the fastener described in the aforementioned Hallock patent is made rigidly connected to the head by welding or by otherwise fastening thereto. Thus the head is prevented from tilting as the fastener is processed, shipped and handled prior to being inserted. The remaining leg is hinged to the head and thus is caused to spread freely when inserted resulting in the requisite locking of the fastener to the concrete substrate. Moreover, the leg-to-head junction is stronger in the improved modification of the invention, resulting in an improved resistance of the head to breaking off from the leg portion, which means greater holding power of the improved fastener.

DESCRIPTION OF THE PREFERRED EMBODIMENT

The improved sheet metal fastener of the invention is best described in detail with reference to the accompanying drawings wherein.

Figure 1:
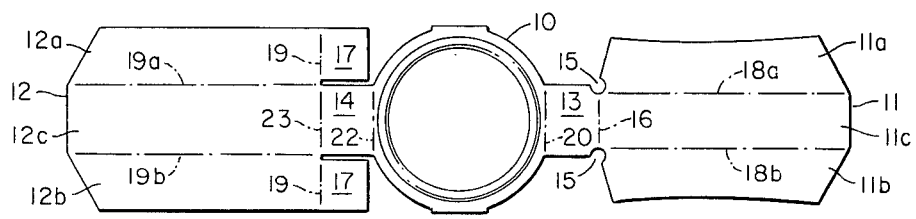
FIG. 1 is a plan view of a blank from which the fastener of the invention can be made.

In FIG. 1 a blank from which the fastener of the invention can be made is shown. The blank has a central, generally flat head or cap portion 10 and a pair of extensions from the head, 11 and 12, which form the legs 11 and 12, respectively, making up the hollow shank portion of the assembled fastener shown in FIGS. 2, 3 and 6. Each of extensions 11 and 12 have outward flaps 11a, 11b, 12a, and 12b, which form the lateral, generally parallel sides of the legs 11 and 12 of the finished fastener in FIGS. 2, 3 and 6. Each extension also has intermediate portions 11c and 12c which form a third intermediate wall portion of each leg of the assembled fastener. The extensions 11 and 12 further have flaps 13 and 14 respectively, connecting the intermediate portions of the extensions to the head 10. Undercuts 15 are provided at the juncture of the connecting flap 13 with the flaps 11a and 11b to provide a narrow flexible hinge along the line 16 between the leg 11 and the head 10 in the finished fastener. Extension 12 further has a pair of additional flaps 17 which serve to secure the leg 12 to the head 10 in a relatively rigid manner when the fastener is finally assembled.

The blank shown in FIG. 1 is made into the fastener shown in FIGS. 2, 3 and 6 as follows. Flaps 11a and 11b are folded downwardly along the lines 18a and 18b to give a generally U-shaped configuration to the leg 11.

Moreover, the folding along the lines 18a and 18b is accomplished in a manner such that the intermediate portion 11c is curved inwardly in the direction of opposed leg 12 in the finished fastener. Each of the flaps 17 of extension 12 are then folded upwardly approximately ninety degrees along the line 19, and thereafter the flaps 12a and 12b are folded downwardly approximately 90° to give leg 12 also a general U-shaped configuration. The width of intermediate portion 12c is somewhat greater than that of 11c in order that the side portions 12a and 12b of leg 12 overlap the side portions 11a and 11b in the assembled fastener as shown in FIG. 2.

Figure 3:
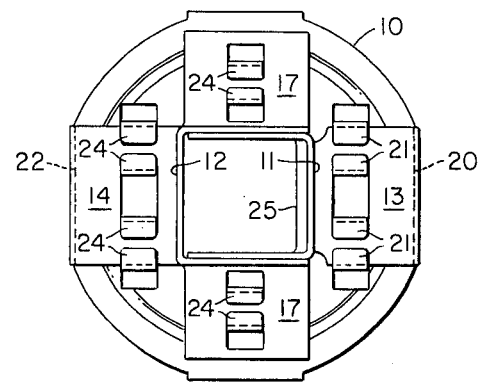
FIG. 3 is a view looking upwardly from the penetrating end of the fastener of FIG. 2 to the underside of the head.
Figure 2:
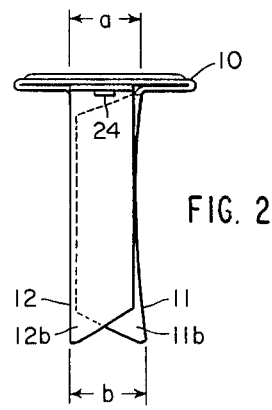
FIG. 2 is a side view of the fastener made from the blank of FIG. 1.
Figure 6:
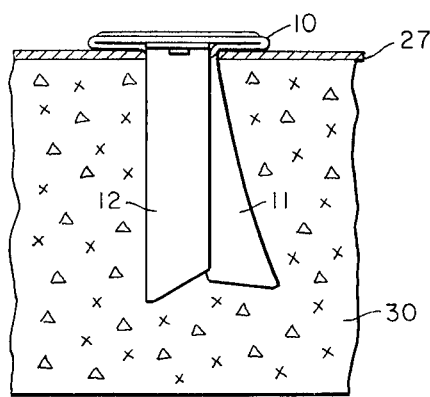
FIG. 6 is side view of the fastener of the invention properly positioned in a lightweight concrete substrate.

The extension 11 is then folded along the line 16 and the line 20 such that the underside of flap 13 lies flat against the bottom of head 10 as shown in FIG. 3, and the direction of leg 11 is downwardly from cap 10 as shown in FIGS. 2, 3 and 6. Flap 13 can be secured to head 10 by punching out portions 21 of head 10 and flap 13 and folding the punched-out portions over flap 13 as shown in FIG. 3. The leg 11 however remains easily bendable in an outward direction along the narrow fold line 16. Flaps 17 are than folded upwardly approximately 90° and extension 12 then folded along lines 22 and 23 in a manner similar to extension 11 along the lines 16 and 20. This results in flaps 14 and 17 being positioned flat against the underside of head 10 as shown in FIG. 3, with leg 12 extending downwardly from the head 10 and substantially completely enveloping leg 11. Punch-outs 24 or portions of the head 10 and flaps 14 and 17 are used to secure the leg 12 to the head 10. The result is that while leg 11 is easily flexed with respect to head 10, leg 12 cannot move with respect to head 10.

Referring now particularly to FIG. 2, the assembled fastener is seen to have a generally flat head serving also as a washer, and a hollow, somewhat square, shank portion made up of the opposed, U-shaped, overlapped legs 11 and 12. The penetrating ends, that is, the ends of legs 11 and 12 distant from the head 10, can be pointed as shown to make penetration of the covering and the soft cement easier. As disclosed in the U.S. Pat. No. 3,710,672 the cross section of the shank immediately below the head, $a$ in FIG. 3, is preferably substantially equal to the cross section of the shank at the penetration end, $b$ in FIG. 3. Thus when the nail is driven, the size of the opening which is made by the penetrating end and is not materially larger than the size of the shank immediately beneath the head, thereby avoiding an an enlarged opening which would result if crossed section $b$ were made larger than $a$. It should be noted that the cross section of the shank at a point intermediate of sections $a$ and $b$ will be less than either $a$ or $b$ due to the inward curvature of intermediate wall 11c. This inwardly curved portion can be seen as 25 in FIG. 3.

Figure 4:
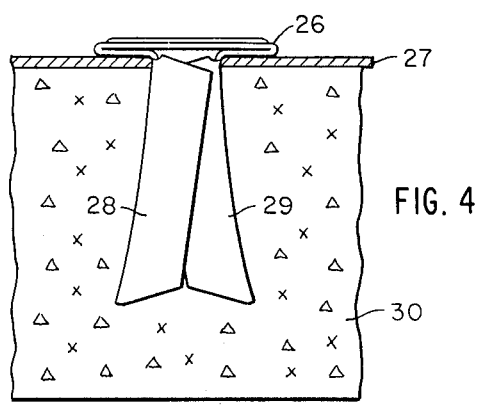
FIG. 4 is a side view of a prior art fastener having two hinged legs and properly installed in a lightweight concrete substrate.
Figure 5:
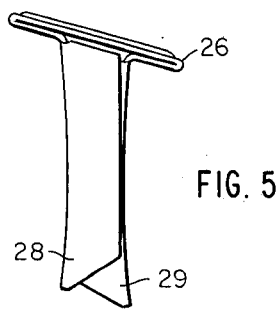
FIG. 5 is a side view of a prior art fastener having two hinged legs and wherein the legs are improperly positioned with respect to the head.

In FIGS. 4 and 5, the fastener disclosed in the U.S. Pat. No. 3,710,672 to Hallock is illustrated first in an ideal installation (FIG. 4), and in an improper, misaligned configuration (FIG. 5). With reference to FIG. 4, the head or cap 26 is shown as seated flush upon the surface base ply covering 27, with hinged legs 28 and 29 nicely spread and anchored in insulating concrete 30. However, misalignment of the head with the legs 28 and 29 as shown in FIG. 5 can result from handling of the nail with the result that the head 26 becomes tilted.

In FIG. 6, the installation of the improved fastener of the invention is illustrated. Upon insertion, the leg 12 which is fixed rigidly to head 10 by way of flaps 17 maintains the proper alignment of the head with respect to the legs. The hinged leg 11 has spread for the required anchoring of the fastener in the concrete. The rigid leg 12 also makes a stronger bond between the head 10 and shank due to the fastening of flaps 17 to the head and to the absence of undercuts from flaps 14 which would have been necessary were the leg 12 hinged to head 10 in the manner of leg 11.

What we claim is:

1. An improved sheet metal nail for attaching a covering material to a cementitious construction material, said nail comprising a generally flat planar head and an elongated hollow shank depending from said head at substantially a right angle thereto, said shank being narrower than said head and having a penetrating end remote from said head, said shank being comprised of a pair of legs, each said leg being substantially channel-shaped in transverse cross-section, one of said legs being rigidly connected to said head in order that the angle between said rigidly connected leg and said head is maintained when the nail is driven, the other of said legs being hingedly connected to said head, said hinged connection being the only manner in which said hinged leg is connected to said nail and the hinged movement of said leg being in no other manner restricted whereby said leg is able to easily spread when the nail is driven, said legs further being in overlapping relationship and defining a hollow enclosure prior to being driven, at least a portion of said enclosure intermediate the ends thereof having a cross-sectional area less than the cross-sectional area at said one end, said portion including means to cause at least a portion of said hinged leg to spread apart from said rigidly attached leg when driven into engagement with said cementitious construction material while other portions of said legs remain in overlapping relationship, whereby a plug of the construction material is retained between the spread apart legs which maintains them in spread position in order to increase the resistance to withdrawal of the nail from the said construction material.

2. The nail of claim 1 wherein each of said legs is generally U-shaped in cross-section and said legs are substantially oppositely disposed.

3. The nail of claim 1 wherein the hinged leg has three sides, two of which are straight and joined together by the third side, at least a portion of the third side being inclined inwardly toward said other leg.

4. The nail of claim 1 wherein the intermediate oppositely facing portions of each of the legs is curved inwardly.

5. The nail of claim 1 wherein the cross-sectional area of the shank adjacent to the head and adjacent to the penetrating end are substantially of equal size and wherein further the cross-sectional area intermediate such ends is of reduced size.

6. An improved sheet metal nail for attaching a covering material to a cementitious construction material, said nail comprising a generally flat, planar head and an elongated hollow shank depending at substantially a right angle thereto, said shank being narrower than said head and having a penetrating end remote from said head, said shank being comprised of a pair of opposed channel-shaped legs each leg having two longitudinally straight, parallel outer sides and a third intermediate side connecting the two outer sides, said legs being in substantial overlapping relationship, with the straight outer sides of one such leg being received substantially their full width within the straight sides of the other such leg, one leg being rigidly connected to said head in order that the angle between said rigidly connected leg and said head is maintained when the nail is driven, the other of said legs being hingedly connected to said head, said hinged connection being the only manner in which said hinged leg is connected to said nail and the hinged movement of said leg being in no other manner restricted whereby said leg is able to easily spread when the nail is driven, the opposed intermediate sides of each said leg being separated at their ends nearest said head substantially the same distance as at their penetrating ends, at least the intermediate side of said hingedly connected leg being curved inwardly towards the other of said legs, whereby upon being driven said hinged leg is caused to spread in a direction outwardlly from rigidly attached leg.

* * * * *